(12) United States Patent
Missotten et al.

(10) Patent No.: US 9,010,240 B2
(45) Date of Patent: Apr. 21, 2015

(54) SQUARE BALERS

(75) Inventors: Bart M. A. Missotten, Winksele (BE);
Niklaas G. C. Monteyne, Blankenberge (BE); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/126,377

(22) PCT Filed: Jun. 12, 2012

(86) PCT No.: PCT/EP2012/061100
§ 371 (c)(1),
(2), (4) Date: Mar. 28, 2014

(87) PCT Pub. No.: WO2012/171907
PCT Pub. Date: Dec. 20, 2012

(65) Prior Publication Data
US 2014/0216280 A1    Aug. 7, 2014

(30) Foreign Application Priority Data
Jun. 15, 2011  (BE) .................................. 2011/0363

(51) Int. Cl.
*A01F 15/08*     (2006.01)

(52) U.S. Cl.
CPC .................................. *A01F 15/0825* (2013.01)

(58) Field of Classification Search
USPC ........... 100/2, 3, 4, 7, 35, 50, 51, 179, 188 R, 100/45; 56/10.2 R, 10.2 A, 10.2 G, 341, 344
See application file for complete search history.

(56) References Cited

U.S. PATENT DOCUMENTS

| 5,226,356 | A  | * | 7/1993 | Schrag et al. ................... 100/41 |
| 6,543,342 | B2 | * | 4/2003 | Leupe et al. .................... 100/45 |
| 6,651,416 | B2 | * | 11/2003 | Parker et al. ..................... 56/341 |
| 6,786,143 | B2 | * | 9/2004 | Leupe et al. ....................... 100/4 |
| 7,104,191 | B1 |   | 9/2006 | Parker et al. |
| 2004/0187468 | A1 | | 9/2004 | Krone et al. |
| 2013/0008324 | A1 | | 1/2013 | Verhaeghe et al. |

FOREIGN PATENT DOCUMENTS

EP     0276496 A1    8/1988

* cited by examiner

*Primary Examiner* — Jimmy T Nguyen
(74) *Attorney, Agent, or Firm* — Patrick M. Sheldrake; Seyed V. Sharifi T.

(57) ABSTRACT

A square baler includes a control system having a closed loop mode of operation in which at least one of the volume of the feeder duct and the threshold pressure of the pressure sensor is varied automatically to maintain the capacity parameter within one of a plurality of desired capacity ranges. The desired capacity range is selected by the control system in such a manner as to maintain the width of each slice in the finished bale within predetermined limits.

12 Claims, 1 Drawing Sheet

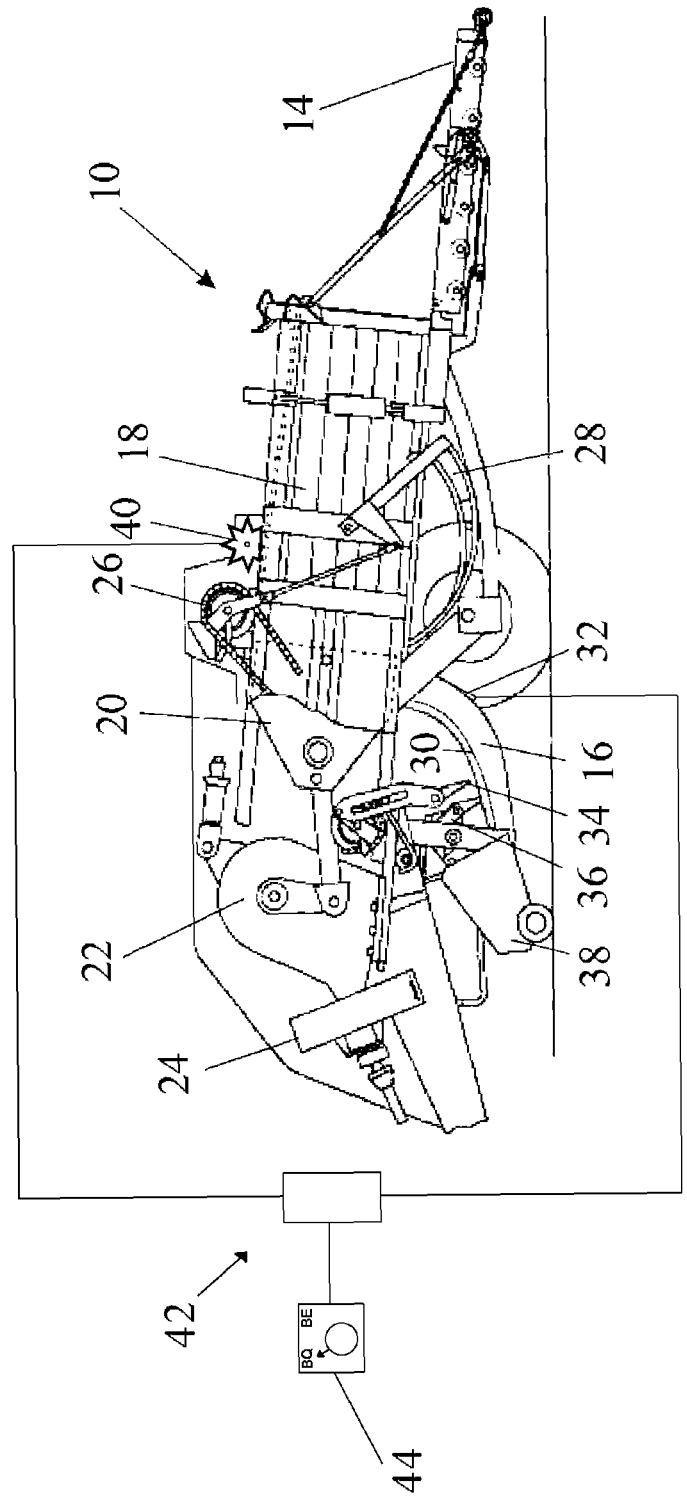

US 9,010,240 B2

SQUARE BALERS

This application is the US National Stage filing of International Application Serial No. PCT/EP12/061100 filed on Jun. 12, 2012 which claims priority to Belgian Application BE2011/0363 filed Jun. 15, 2011, each of which is incorporated herein by reference in its entirety.

FIELD OF THE INVENTION

The present invention relates to a square baler having a control system for optimising bale quality.

BACKGROUND OF THE INVENTION

Balers are machines that pick-up crop that has been deposited in windrows or swathes and compact it into bales. The crop may be, for example, straw that has been deposited by a combine harvester or grass cut by a mowing machine. The balers themselves can be self-propelled or towed by a tractor and the bales can be round or square. The present invention is particularly concerned with square balers but is not restricted to any particular crop.

As with all balers, a square baler has a pick-up for raising the crop from the ground, a crop transport mechanism and a baling chamber. The transport mechanism in a square baler comprises feeder duct that acts as a pre-compression chamber into which the crop is introduced and in which the crop is pre-compressed by a packer. Sometimes a cutter is provided at the lower end of the intake feeder duct to chop the crop before it is formed into bales.

When a desired degree of compression has been reached in the intake feeder duct, as detected for example by movement of a spring biased flap in the wall of the intake feeder duct, a so-called stuffer is actuated to upload the contents of the intake feeder duct into a square baling chamber where it is compressed further to form a bale. The bale is built up in slices in this way until the desired bale length is reached.

The compression of the crop in the baling chamber is carried out by a constantly reciprocating plunger which pushes the bale being formed against a resistance offered by a previously formed bale that is in the process of being ejected from the baling chamber. To set its resistance to movement, the previously formed bale is gripped from the sides and/or from above by walls to which a hydraulic pressure is applied in a direction to compress the bale.

The hydraulic pressure that is varied to regulate the density of the bale being formed can be set manually or automatically. In the latter case, instead of manually setting the magnitude of the hydraulic pressure, the operator sets a desired degree of resistance. The actual degree of resistance is measured, for example from the reaction force on the plunger, and compared with the desired resistance to derive an error signal. The hydraulic pressure is then varied in a closed feedback control loop to minimise the error signal and thereby attain the desired resistance set point.

A sensor is provided that measures movement of a bale as it is being formed in order to determine its length. Once a bale in the baling chamber reaches the desires size, lengths of twine are wrapped around the bale and they are knotted to complete the baling process.

There are numerous operating parameters that can be set by the operator that affect baling quality, this term being used herein to refer both the quality of the bales themselves and to the baling efficiency, i.e. the weight of crop baled in a given time.

Bale quality is unacceptable if the bale density is too low or too high, if the bale length or weight is outside a specified range, if the bale density is not uniform across the width of the bale, or if the twine tension is too high or too low. Incorrect twine tension can result in bales of poor shape or bales that fall apart while they are being handled.

It has previously been proposed in EP 0276496 to construct a feeder duct of which the volume can varied by changing the distance between its two curved walls. In addition to such parameters as the tractor speed, the steering angle, and machine settings such as the twine tension and the degree of compression in the pre-baling chamber, the control of the volume of the feeder duct provides a further parameter that can be used to achieve the desired baling quality. However, because of the large number of parameters to be set and the fact that the settings are not all independent of one another, it is difficult for an operator, especially one who is inexperienced, to set the values of all the parameters correctly at the same time as driving at the correct speed and in the correct direction.

SUMMARY OF THE INVENTION

With a view to simplifying the operation of a square baler, there is provided in accordance with the present invention a square baler having a baling chamber, a constantly reciprocating plunger for compacting crop in the baling chamber, a variable volume feeder duct in which crop is pre-compressed by a packer, a pressure sensor for determining the packing density of the crop within the feeder duct, a stuffer for transferring a slice of crop from the feeder duct to the baling chamber at the first opportunity afforded by the position reciprocating plunger after a density threshold has been sensed by the pressure sensor to have been exceeded, and a bale movement sensor for determining the width of each slice after compression by the plunger, characterised by a control system operative to determine a capacity parameter indicated by the time from commencement of filling of the feeder duct to the time when the threshold pressure in the feeder duct is exceeded expressed in terms of cycles of the plunger and having a closed loop mode of operation in which at least one of the volume of the feeder duct and the threshold pressure of the pressure sensor is varied automatically to maintain the capacity parameter within one of a plurality of desired capacity ranges, the desired capacity range being selected by the control system in such a manner as to maintain the width of each slice in the finished bale within predetermined limits.

Optimising bale quality is complicated by the fact that the contents of the feeder duct cannot be uploaded into the baling chamber immediately after it has been sensed that the desired mass of crop has been accumulated in the duct. This is because the slices are uploaded into the baling chamber through an opening that is only open when the constantly reciprocating plunger it is near its bottom dead centre position. The stuffer operation must therefore be timed to take place only during certain angular positions of the crank driving the plunger. If the desired crop density in the feeder duct is only reached shortly after plunger has closed the opening in the bale case, it is necessary to wait for nearly a complete cycle of the plunger before the slice that is being formed can be uploaded into the baling chamber. During this time more crop will have been packed into the feeder duct raising the crop density to a level well above that desired, resulting in poor bale quality (excessive weight and twine tension).

The optimum settings will in practice depend on whether the operator wishes to optimise baling efficiency (mass of crop baled per hour) or bale quality. In an embodiment of the invention, a manually operable selector may be provided to enable the operator to select between at least two operating modes of the control system, the first optimising bale quality and the second optimising baling efficiency.

BRIEF DESCRIPTION OF DRAWINGS

The invention will now be described further, by way of example, with reference to the accompanying drawing which is a schematic representation of a square baler.

DETAILED DESCRIPTION OF THE PREFERRED EMBODIMENT

The drawing shows a square baler 10 designed to be towed at its left hand end, as viewed, by a tractor. The mechanisms on board the baler for picking up, compressing and tying the crop are all driven by a gearbox 22 connected to the power take off shaft of the tractor through a flywheel 24. The compression of the crop is performed by a plunger 20 that reciprocates constantly in a baling chamber defined by a bale case 18.

Crop is introduced into the baling chamber from a feeder duct 16 that acts as a crop pre-compression chamber. Crop is gathered from the ground by a pick-up 38 and pushed into the feeder duct 16 by a packer 36. A sensor 32 determines when the desired pressure has built up in the feeder duct 16 and at the next opportunity allowed by the position of the plunger 20, a stuffer arm 34 sweeps the length of the feeder duct 16 to transfer its entire contents into the baling chamber. This slice of crop is then further compressed in the baling chamber and as the bale grows its size is determined by a bale movement sensor 40.

When the bale reaches a designed length, a knotting operation is commenced. Needles 28 operated by a knotting mechanism 26 raise runs of twine through the bale case to form continuous bands of twine surrounding the completed bale. The ends of the twine bands are then knotted to one another and severed from twine supply reels. The tension in the twine and the resistance to movement of the completed bale provide the reaction against which the crop in the next bale to be produced is compressed. The completed bale eventually leaves the baling chamber and slides down a discharge chute 14 onto the ground.

In the present invention, the feeder duct 16 has variable geometry to allow its volume to be changed. This is represented in FIG. 1 by the alternative position of the top wall 30 of the feeder duct 16, shown by a dotted line. A suitable mechanism for achieving a feeder duct of variable volume is described in EP 0276496, which is imported herein by reference. The feeder duct 16 also has a variable sensitivity sensor 32 in the form of a door in the bottom wall of the feeder duct 16. The door is opened against the action of a spring as the pressure exerted by the pre-compressed crop in the feeder duct 16 increases.

As the baler moves along the ground, crop will be introduced by the pick-up 38 into the feeder duct 16 at a rate that will depend on the ground speed and the density of the crop lying on the ground. Though the flow of crop is steady, the emptying of the feeder duct 16 is carried out periodically and can only take place when the plunger 20 is near its bottom dead centre position.

If the aim of the operator is to maximise baling efficiency, then bales of varying length and weight need to be tolerated. For example, if the volume of the feeder duct 16 is increased by movement of its top wall to accept more crop, then this would cause more variation between the length of different bales. Furthermore, if a considerable delay is tolerated between the time that the feeder duct 16 is deemed to be full and the time that the plunger 20 is in a position to allow the pre-compressed slice to be uploaded into the baling chamber, then this will result in bales of higher density and greater weight than desired.

For bales of good quality, on the other hand, it is desirable to select a slice thickness that is sufficiently great for the bale to be firm but small enough to allow variations in the length of the bales to be maintained within a narrow range, say 5 to 10 cms. It is furthermore desirable to set the volume of the feeder duct 16 and to set the density at which the sensor 32 is triggered such that that each slice is uploaded into the baling chamber soon after the set density or pressure threshold has been reached.

In view of the above conflicting requirements, a control system 42 cannot optimise both baling efficiency and bale quality. For this reason, the control system 42 preferably includes a mode selector 44 to allow the operator to select between baling efficiency optimization BE and bale quality optimization BQ.

When bale quality BQ is selected by the operator, the control system 42 operates in a closed loop mode in which the mass of crop required to fill the feeder duct 16 to the desired density is varied automatically in dependence upon a parameter often referred to as the "capacity". The capacity is the length of time taken to load the desired mass of crop into the feeder duct 16 expressed in terms of the number of plunger cycles. Thus, for example, a capacity of 1.9 means that it takes slightly less than two complete cycles of the plunger to accumulate the desired mass of crop in the feeder duct for uploading a slice into the baling chamber, this time being measured from the end of a stuffer cycle until the desired crop is again sensed by the sensor 32 in the feeder duct 16.

Ideally, the capacity value should be a little less than a whole number. In that way, the plunger uncovers the opening in the bottom of the baling chamber at the right time to allow the precise mass of crop at the desired density to be transferred into the baling chamber. A capacity value of say 1.2 is far from ideal because the feeder duct will contain nearly twice the mass of crop at nearly twice the desired density by the time it is uploaded into the baling chamber, and this would result in the bale being overweight.

The mass of crop in the feeder duct at the time that it is ready for uploading into the baling chamber is varied in the present invention by a closed feedback which changes the volume of the feeder duct 16 or the pressure at which the sensor 32 is triggered so that the capacity parameter is always maintained within a one of several capacity ranges, each of which is slightly below a whole number value. Small changes are made by the closed feedback control to the volume of the feeder duct 16 or the sensitivity of the sensor 32 such that a slice is always ready for uploading shortly before the time when the plunger 20 is in a position to allow the slice to be introduced by the stuffer 34 into the baling chamber. The bale quality is thus optimised in that the bale will be made up of slices of substantially uniform mass and density and hence thickness.

A time may come however if the flow rate of crop through the pick-up 38 varies excessively when the resulting slice thickness, as measured by the bale movement sensor 40, lies outside permitted limits. For example, if because of a drop in crop flow rate into the feeder duct 16 a capacity value of say 0.9 could only be maintained by reducing the slice thickness to 3 cms, then the control system will change the volume of the feeder duct and/or the sensitivity of the sensor 32 to double the mass of crop required to fill the feeder duct and then attempt by closed loop feedback to maintain a capacity of say 1.9.

Conversely, if the closed loop feedback should result in the slice thickness exceeding a maximum limit then the volume of the feeder duct could be reduced and the closed loop control would maintain a reduced capacity value. In other words, the capacity value is maintained within one of several local ranges, each slightly less than a whole number, but the local range is selected to maintain an acceptable slice thickness in the finished bale.

The logic performed by the closed loop control when optimising bale quality is first to measure the capacity parameter and to set local maximum and minimum values. Closed loop control is then relied upon the maintain the measured capacity parameter between the set limits by increasing or decreasing the mass of crop needed in the feeder duct to trigger operation of the stuffer, this being done by varying the volume of the feeder duct 16 and/or the sensitivity of the sensor 32. The slice thickness is in the meantime monitored by the bale movement sensor 40 to ensure that it remains between preset limits. Should the slice thickness depart from the desired range then the local minimum and maximum capacity values are incremented or decremented as necessary to return the slice thickness to the desired range.

The invention claimed is:

1. A square baler comprising
  a baling chamber,
  a constantly reciprocating plunger for compacting crop in the baling chamber,
  a variable volume feeder duct in which crop is pre-compressed by a packer,
  a pressure sensor for determining the packing density of the crop within the feeder duct,
  a stuffer for transferring a slice of crop from the feeder duct to the baling chamber at the first opportunity afforded by the position reciprocating plunger after a density threshold has been sensed by the pressure sensor to have been exceeded, and
  a bale movement sensor for determining the width of each slice after compression by the plunger,
  a control system configured to determine a capacity parameter indicated by a time from commencement of filling of the feeder duct to a time when the threshold pressure in the feeder duct is exceeded expressed in terms of cycles of the plunger and having a closed loop mode of operation in which at least one of the volume of the feeder duct and the threshold pressure of the pressure sensor is varied automatically to maintain the capacity parameter within one of a plurality of desired capacity ranges, the desired capacity range being selected by the control system in such a manner as to maintain the width of each slice in the finished bale within predetermined limits.

2. A square baler as claimed in claim 1, wherein the capacity parameter is a little less than a whole number, so that the plunger uncovers an opening in the bottom of the baling chamber when the precise mass of crop at the desired density to be transferred into the baling chamber is in the feeder duct.

3. A square baler as claimed in claim 2, wherein the capacity parameter equals 0.9, 1.9, 2.9, 3.9 or 4.9 times one cycle of the plunger.

4. A square baler as claimed in claim 1, wherein a manually operable selector is provided to enable an operator to select between at least two operating modes of the control system, a first mode optimizing bale quality and a second mode optimizing baling efficiency.

5. A square baler as claimed in claim 4, wherein a delay is tolerated between a time that the feeder duct is deemed to be full and a time that the plunger is in a position to allow the pre-compressed slice of crop to be uploaded into the baling chamber when the operator selects the baling efficiency second mode of the control system.

6. A square baler as claimed in claim 5, wherein the baling efficiency second mode of the control system results in bales having at least one of a varying length and weight.

7. A square baler as claimed in claim 4, wherein a the mass of crop required to fill the feeder duct is varied in dependence upon the capacity parameter when the operator selects the baling quality first mode of the control system.

8. A square baler as claimed in claim 1, wherein the width of each slice after compression by the plunger is between 5 and 10 cms.

9. A method for making bales with a square baler comprising a baling chamber, a reciprocating plunger for compacting crop in the chamber, a variable volume feeder duct for pre-compressed crop, a pressure sensor for determining the packing density of the crop within the feeder duct, a stuffer for transferring a slice of crop from the feeder duct to the baling chamber after a density threshold has been sensed by the pressure sensor to have been exceeded, and a bale movement sensor for determining the width of each slice after compression by the plunger, and a control system configured to determine a capacity parameter indicated by the time from commencement of filling of the feeder duct to the time when the threshold pressure in the feeder duct is exceeded expressed in terms of cycles of the plunger and having a closed loop mode of operation in which at least one of the volume of the feeder duct and the threshold pressure of the pressure sensor is varied automatically to maintain the capacity parameter within one of a plurality of desired capacity ranges, the desired capacity range being selected by the control system in such a manner as to maintain the width of each slice in the finished bale within predetermined limits in that the method includes the steps of:
  measuring the capacity parameter;
  setting maximum and minimum values for the thickness of the slices; and
  maintain the measured capacity parameter between the set limits by increasing or decreasing the mass of crop needed in the feeder duct to trigger operation of the stuffer.

10. A method as claimed in claim 9, wherein the maintaining step is performed by varying at least one of a volume of the feeder duct and a sensitivity of the sensor.

11. A method as claimed in claim 9, wherein the maximum and minimum values for the thickness of the slices are monitored by the bale movement sensor.

12. A method as claimed in claim 9, wherein the maintaining of the measured capacity parameter is done by a closed loop feedback system.

* * * * *